United States Patent [19]

Kita et al.

[11] Patent Number: 4,552,566
[45] Date of Patent: Nov. 12, 1985

[54] GLOBULOUS PRODUCTS OF SUBLIMING SUBSTANCE, ITS MANUFACTURING PROCESS AND MANUFACTURING APPARATUS

[75] Inventors: Kouji Kita, Tokyo; Kohei Itakura, Chiba; Shigeo Mitsuhashi, Narita, all of Japan

[73] Assignee: Ise Kagaku Kogyo Kabushiki Kaisha, Tokyo, Japan

[21] Appl. No.: 460,058

[22] Filed: Jan. 21, 1983

[30] Foreign Application Priority Data

Jan. 21, 1982 [JP] Japan ................... 57-6859

[51] Int. Cl.⁴ ............................................... C01B 7/14
[52] U.S. Cl. .................................. 23/313 R; 423/500
[58] Field of Search .................. 62/534, 533; 423/500; 422/244; 159/48.1; 55/82; 23/313 R, 300; 264/117

[56] References Cited

U.S. PATENT DOCUMENTS

| 3,315,442 | 4/1967 | Yuan | 55/82 |
| 3,409,619 | 11/1968 | Kosel | 23/294 |
| 4,042,653 | 8/1977 | Beyn | 264/117 |
| 4,066,424 | 1/1978 | Kilgrin et al. | 55/82 |

FOREIGN PATENT DOCUMENTS

| 1536767 | 12/1978 | United Kingdom | 23/300 |
| 856484 | 9/1981 | U.S.S.R. | 23/300 |

OTHER PUBLICATIONS

Mullin, Crystallisation, CRC Press, 1972 pp. 282-286.

Primary Examiner—Hiram H. Bernstein
Attorney, Agent, or Firm—Oblon, Fisher, Spivak, McClelland & Maier

[57] ABSTRACT

A method of producing globulous products of a subliming substance, which includes the steps of melting the subliming substance, discharging the subliming substance through a nozzle so as to form a plurality of droplets of 0.3 to 5 mm diameter, discharging a non-soluble inert coolant liquid having a boiling point lower than the subliming substance and atomized to a size of 10 to 2500μ so as to contact and cool the droplets, and forming the globulous products so as to have a diameter of 0.3 to 5 mm.

2 Claims, 2 Drawing Figures

GLOBULOUS PRODUCTS OF SUBLIMING SUBSTANCE, ITS MANUFACTURING PROCESS AND MANUFACTURING APPARATUS

BACKGROUND OF THE INVENTION

1. Field of the Invention

This invention pertains to globulous products of a subliming substance, its manufacturing process and an apparatus for its manufacture.

2. Description of the Prior Art

Generally, melted substances are cooled to a sublimated crystal form, lump form, powdered form or grain form, each having specialized handling properties. Among those, granulted material is advantageous in terms of convenience of handling and application as well as obtaining uniformity of reaction, etc. The granulation has generally been performed by flaking the substance by cooling it on a rotating plate or a cylinder, or making it into cake by cooling, and then pulverizing it into grain.

However, these generally applied processes require a rather complicated operation and apparatus and are thus likely to cause difficulty in the handling of corrosive and/or subliming substances. Further, some subliming substances sublimate as powdered material and attach to the surface of grain state products, or cause the material to cake after packaging because of those powdered materials.

SUMMARY OF THE INVENTION

The inventor has made various studies to solve said difficulties of globular shaping of subliming substances and has derived a method which causes the subliming substance to be melted and continuously blown out from a nozzle, and form liquid droplets which are blown into an atomized spray of a non-soluble liquid having a boiling point lower than the melting point of the subliming substance, such that at a predetermined time the droplets are diffuse and fall so as to thus cool and solidify the droplet. This method can smoothly and advantageously process a corrosive and/or subliming substance without a complicated apparatus or operation. Further, the globulous products obtained are a novel form of globulous products with a smooth surface of metallic gloss, the surface of the grain being free from partly sublimated and powdered material, and with no occurrence of caking after being packaged.

Thus the invention provides novel globulous products of a subliming substance of 0.3 to 5 mm in diameter with a smooth surface of metallic gloss, and a novel method of making globulous products of a subliming substance by producing melted subliming material in the form of liquid droplets of 0.3 to 5 mm diameter, and causing the same to be contacted with a mist atmosphere of non-soluble inert liquid having a boiling point lower than the melting point of said subliming substance and cooling said liquid droplets to solidify them. The invention also provides a novel apparatus for manufacturing globulous products of a subliming substance smoothly, and advantageously using said process and structural members as will be described hereinbelow.

In this invention, it is essential to form droplets of a melted subliming liquid substance, which droplets are contacted with an atomized liquid coolant and are cooled and solidified. For example, the subliming substance forms melted droplets which are blown out from a nozzle and drop, and simultaneously, atomized liquid as a coolant is blown into the melted droplets to quickly solidify the same. This can prevent the dispersion of subliming substance so as to result in raising the efficiency of the process and also suppressing the yield of pulverized powder which may be the cause of caking of the products. Further, it is important that the atomized liquid used as a coolant be a non-soluble liquid having a boiling point lower than the melting point of the subliming substance. The term non-soluble is meant to mean that the atomized liquid will not dissolve the subliming substance, and inert material shall be selected from such material such that the atomized liquid will not react with a subliming substance (for example water, alcohol, hydrocarbon, etc.). Thus the small particles of the liquid in an atomized condition as a coolant will contact the surface of the liquid droplets of the melted subliming substance and undergo heat exchange with the droplets. Namely the subliming substance is cooled and solidified in the state of a liquid droplet, and the atomized coolant contacts the droplet, which droplet has a temperature higher than the boiling temperature of the coolant, to obtain latent heat of evaporation, be vaporized and gasified and easily exhausted to a location outside the system. Therefore, the atomized liquid as a coolant will not be mingled in the globular products of subliming substance.

The globulous products of this invention are 0.3 to 5 mm in diameter, preferably 0.5 to 3 mm, and the distribution of the grain size can be determined so as to fall into a very narrow range. The desired grain size can easily be obtained by controlling the size of the droplet when the subliming substance melts and is contacted with the atomized liquid. On the other hand, the atomized liquid as coolant is desirably as small as possible, 10 to $2500\mu$ and desirably 200 to $600\mu$.

The globulous products of this invention do not yield powdered material, which will cause caking as stated, and further the grain is such as to provide a smooth surface globulous body which reduces contact surface and further reduces the chance of generating cake. Also the invention is effective for efficient handling, and in the case of iodine, etc., loss by dissipation as a vapor can be reduced, thus providing a reduction of cost. Further, the process allows control so as to make an almost even distribution of grain size, to have a stable solving rate, without causing rapid dissolving, and the reaction can be more rate-determined in comparison with a conventional flaking, or other process, for iodine.

In this invention, said process can be performed by proper arbitrary equipment. However, the novel apparatus described below is an especially suitable embodiment. Namely, equipment for making a globulous product of a subliming substance consists of a body (1) which encloses the contacting space, and is joined with a droplet making nozzle (2) which serves to melt a subliming substance into droplets of liquid and is introduced into the main body (1), and spray nozzle (3) which atomizes and introduces coolant consisting of a non-soluble inert liquid into the body (1), and further a port (4) for removal of grain products of a subliming substance, and a discharge exit port (5) for the evaporated vapor of the coolant.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PRESENT EMBODIMENTS

Figure 1:
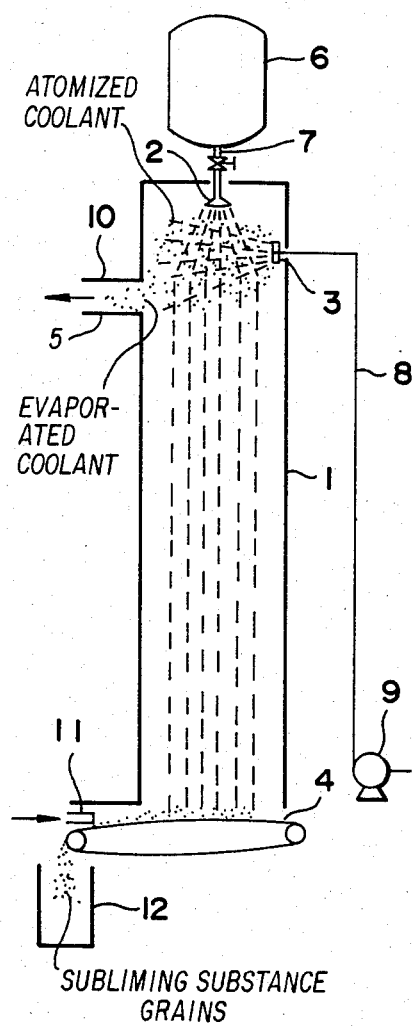
FIG. 1 is a sectional view of a first embodiment of the invention.

Now, an exemplary example of this invention is explained by referring to FIG. 1; a melting pot (6) is installed over the open-bottomed cylindrical main body (1) to melt a subliming substance such as iodine. The droplet making nozzle (2) is connected to the melting pot (6) through a pipe line (7) penetrating the upper portion of the body (1), and the subliming substance is melted to form liquid droplets. Coolant spraying nozzle (3) is arranged horizontally to the side wall of the body (1) at a position below the droplet making nozzle (2), where the melted subliming substance is ejected out of nozzle (2) and changes to a discontinuous state from continuous flow. Coolant is fed to nozzle 3 through connection of pipe (8) from the pump (9), and atomized coolant is blown against the melted subliming substance in a discontinous state to cool the substance to form globulous sublimating products.

The discharge port (5) is opened to the side wall of the body (1) at a location opposite to the coolant spraying nozzle (3) and lower than said nozzle (3), and a gas inlet-outlet pipe (10) is connected so that exhaust gas is absorbed to an exhaust gas collecting tower (not shown).

Further an air feed pipe (11) is installed at the lower portion of the body (1) so that air can normally be supplied therethrough. Also at the lower side of the body (1) a product removal port (4) is situated in association with collecting means such as a conveyer to receive globular subliming substance, and arranged to transfer such substance to the receiver vessel (12) installed at the lower side of the removal port (4).

Figure 2:
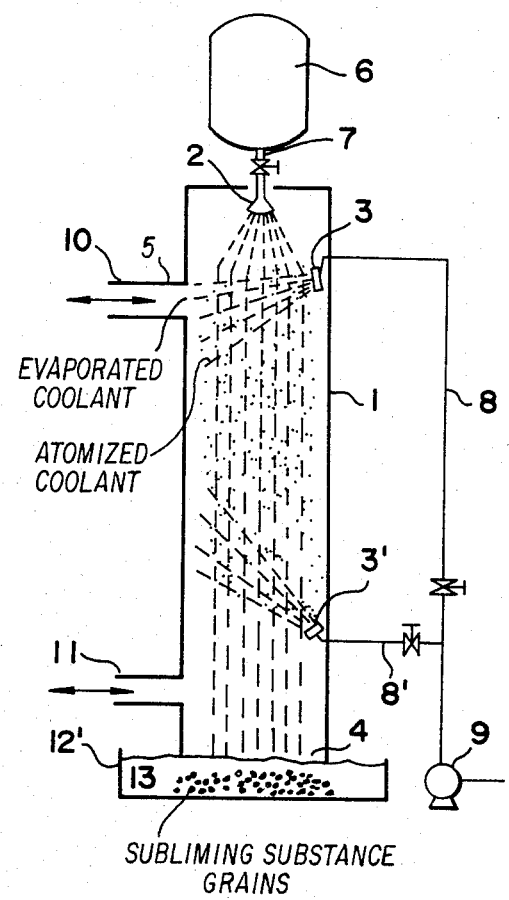
FIG. 2 is a sectional view of a second embodiment.

The second embodiment is explained with respect to FIG. 2, wherein the lower side of the body (1) is installed to join to the receiving vessel (12') which is filled with a coolant such as water. The coolant spraying nozzle (3) situated on the upper side of the body (1) is installed with a downward inclination, and a second coolant spraying nozzle (3') is installed at the lower part of the body with an upward inclination and connected to the branched feed pipe (8'), such being branched out from the supply pipe (8) which connects said coolant spraying nozzle (3, 3') to the pressure pump (9). Also inlet and outlet pipes (10) and (11) are installed at upper and lower sides of the body (1), either one of which is connected to the exhaust gas collecting tower, the other being connected to the air supply source.

The remaining structure is the same as the first exemplary embodiment, and further explanation is thus omitted.

By adoption of the above-described apparatus, the invention has the following advantages; the conventional flakers of a cooling disk type or a cooling cylinder type have many metallic parts and rotating parts, causing significant corrosion due to the influence of iodine or other materials, equipment failure due to the induction of foreign materials into the rotating portion, or human casualties. It was also necessary to use highly expensive corrosion resisting material or metals to the cooling disks where melting iodine or other materials cooled and solidified, resulting in the necessity of expensive machinery. In this regard, this invention can reduce the metallic and rotating portion to a large extent, and is mainly made of plastic, therefore allowing for excellent corrosion resistance and less danger of corrosion and of failure of the rotating parts. It allows for a simple structure so as to make the whole assembly cheaper and provides for easy routine maintenance control, thus resulting in a running cost reduction.

Moreover, this invention uses a nozzle for forming liquid drops of a melting subliming substance, the nozzle being installed at the upper portion of the body enclosure, thus utilizing an optimal method of having liquid drops fall in the body of the apparatus. The diameter of such liquid drop forming nozzle was adopted to be about 0.2 to 3 mm in diameter, preferably to be 0.5 to 2 mm. The liquid falls in a continuous or bar form just after leaving the nozzle in accordance with the nozzle diameter and fluid pressure. However, it will later change to discontinuous liquid droplets of 0.3 to 5 mm diameter size, corresponding to the diameter of the nozzle, by the effect of surface tension. Atomized coolant is contacted with such liquid droplets by blowing or other suitable methods. As for the droplet forming nozzle, there is no special limit as to the number of holes, and such may have several holes. A plurality of nozzles having such holes may be used.

Now, further explanation will be made on an exemplary embodiment of this invention. According to FIG. 1, a method of granulating iodine (with a melting point of 113.5° C.) using distilled water as an atomized liquid (with a boiling point of 100° C.) will be explained. Molten iodline (at 130° C. to 150° C.) is drawn from the iodine melting pot (6) having a 50 liter capacity through duct (7) and is dispersed from the nozzle (2) to the upper center portion of the body (1). The dropping rate of the melting iodine is 5 kg/min from 150 holes of 1 mm diameter from the nozzle. The body (1) is a cylinder of 400 mm diameter, is 3 meters long, is made of vinylchloride, and is exhausted from exit port (5) at the upper portion of the body. The exhaust is led to the exhaust gas recovering tower. At the lower portion of the body (1), air feed pipe (11), belt conveyor (4) and product receiving tank (12) are situated. On the other hand, distilled water is sprayed as a coolant from the spray nozzle (3) at the rate of 400 to 600 gr/min. A pressure pump 9 is also shown. The globulous iodine thus obtained were 0.3 to 5 mm in size, and the distribution of the grain sizes were between 7 to 32 meshes covering 100% of the grain. The globular iodine thus obtained has a smooth surface with a metallic gloss and is of high quality insofar as foreign materials are not mingled in the distilled water.

Now, according to the embodiment of FIG. 2, another example of dropping melted iodine through a dispsersing nozzle is illustrated. The manner in which droplets are contacted with parallel flow or counter flow of atomized coolant to cool slowly, and solidified and cooled and received in the receiving tank filled with coolant, is explained hereinbelow. Melted iodine (130° to 150° C.) is dispersed and dropped in the form of liquid droplets from the nozzle (2) at the upper center of the body (1). The dropping rate is 5 kg/min per 150 nozzle holes in 1 mm diameter. The body (1) is made of a vinylchloride cylinder 400 mm in diameter and 3 meters long and is exhausted from upper exhaust port (5) to lead to the exhaust gas recovering tower. Further, to the lower part of the body (1) an air feeding pipe (11) and a product receiving tank (12') are installed. On the other hand, distilled water as a coolant is sprayed at the rate of 300 to 500 gr/min from spray nozzle (3) or (3'). Again a pressure pump is shown by symbol (9). With this process, globular iodine of 0.5 to 3 mm grain size, with a metallic gloss on the surface were obtained, without inclusion of foreign materials.

What is claimed as new and desired to be secured by Letters Patent of the United States is:

1. A method of producing globulous products of a subliming substance, which comprises:
   melting said subliming substance;
   discharging said subliming substance through a nozzle so as to form a plurality of droplets of 0.3 to 5 mm diameter;
   discharging a non-soluble inert coolant liquid having a boiling point lower than said subliming substance and atomized to a size of 10 to $2500\mu$ so as to contact and cool said droplets; and
   forming said globulous products so as to have a diameter of 0.3 to 5 mm.

2. A method of producing globulous products as set forth in claim 1, wherein said inert liquid further comprises water.

* * * * *